United States Patent
Sugimoto et al.

(10) Patent No.: US 7,385,627 B2
(45) Date of Patent: Jun. 10, 2008

(54) PICTURE FEATURE EXTRACTION SYSTEM AND PICTURE QUALITY EVALUATION SYSTEM

(75) Inventors: Osamu Sugimoto, Saitama (JP); Ryoichi Kawada, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 697 days.

(21) Appl. No.: 10/901,186

(22) Filed: Jul. 29, 2004

(65) Prior Publication Data
US 2005/0031226 A1 Feb. 10, 2005

(30) Foreign Application Priority Data
Aug. 8, 2003 (JP) ............... 2003-290014

(51) Int. Cl.
- H04N 17/00 (2006.01)
- H04N 17/02 (2006.01)
- G06K 9/66 (2006.01)
- G06K 9/46 (2006.01)

(52) U.S. Cl. .................. 348/192; 382/191; 382/207
(58) Field of Classification Search .......... 348/192; 382/100, 248, 250, 190, 191, 207, 209
See application file for complete search history.

(56) References Cited

U.S. PATENT DOCUMENTS 7,123,741 B2 * 10/2006 Ono ............... 382/100
7,149,324 B2 * 12/2006 Tanaka ............ 382/100
7,231,062 B2 * 6/2007 Zhang et al. ..... 382/100
2002/0176002 A1 11/2002 Kawada et al.

FOREIGN PATENT DOCUMENTS

| JP | 2002-247606 | 8/2002 |
| JP | 2003-009186 | 1/2003 |
| JP | 2003-087823 | 3/2003 |

\* cited by examiner

Primary Examiner—M. Lee
(74) Attorney, Agent, or Firm—Westerman, Hattori, Daniels & Adrian, LLP.

(57) ABSTRACT

This invention is intended to reduce a line rate of a monitoring line necessary for transmission of a picture feature without complicating a system. A video signal $x_i(n_0, n_1)$ of each block is subjected to spread spectrum by multiplying the video signal $x_i(n_0, n_1)$ by a PN sequences $S_{PN1}(n_0, n_1)$ (in a step S1). The resultant video signal is orthogonally transformed by DFT, DCT, WHT, or the like (in a step S2). An amplitude component $A_i=|X_i(S_{E0}, S_{E1})|$ of an arbitrary component $(S_{E0}, S_{E1})$ in a coefficient $X_i(S_0, S_1)$ obtained by the steps S1 and S2 is extracted (in a step S3), and the extracted amplitude component is quantized with a step size M (in a step S4). The picture feature F[i] is given as a residue obtained under a modulus $N_m$ of a quantized typical value obtained by the quantization (in the step S4) (in a step S5).

5 Claims, 4 Drawing Sheets (a) ORIGINAL PICTURE AND DECODED PICTURE ARE THE SAME IN THE FEATURE (b) ORIGINAL PICTURE AND DECODED PICTURE DIFFER IN THE FEATURE d2 (X, Y) MATRIX

| X \ Y | 0 | 1 | 2 | 3 |
|---|---|---|---|---|
| 0 | 0 | 1 | 2 | 1 |
| 1 | 1 | 0 | 1 | 2 |
| 2 | 2 | 1 | 0 | 1 |
| 2 | 1 | 2 | 1 | 0 |

PICTURE FEATURE EXTRACTION SYSTEM AND PICTURE QUALITY EVALUATION SYSTEM

BACKGROUND OF THE INVENTION

1. Field of the Invention

The present invention relates to a picture feature extraction system and a picture quality evaluation system. More specifically, the present invention relates to a picture feature extraction system and a picture quality evaluation system capable of reducing the amount of the information of a picture feature for evaluating picture quality degradation caused by video transmission.

2. Description of the Related Art

There is known a method for obtaining picture quality degradation resulting from compression coding applied while transmitting a video, a transmission error, or the like, by comparing picture feature so as to monitor an operating state of a transmission system in a video transmission service. The inventor of the present invention proposed picture quality monitoring or picture quality evaluation systems capable of highly accurately evaluating picture quality degradation by representing the picture quality degradation based on an index of mean square error ("MSE") or a peak-to-noise ratio ("PSNR") in the following Patent Literatures 1 to 3.

When a transmitting-end signal is x(t), a receiving-end (degraded) signal is y(t), and a total number of pixels is N, the MSE is defined by the following Equation (1).

$$\text{MSE} = (1/N) \cdot \Sigma [x(t) - y(t)]^2 \qquad (1)$$

In the Equation (1), symbol t denotes two-dimensional coordinate composed of a horizontal coordinate element and a vertical coordinate element.

The MSE is estimated by causing each of a transmitting end and a receiving end to divide a picture into a plurality of blocks, to extract a coefficient of an arbitrary component in an orthogonal transform coefficient obtained by orthogonal transform, to transmit the extracted coefficient to a central monitoring chamber as a picture feature, and by comparing the transmitting end picture feature with the receiving end picture feature. In addition, the PSNR is derived from an error detection rate which is calculated when an invisible marker buried in the picture is detected.

Patent Literature 1: Japanese Patent Application Laid-Open No. 2003-87823

Patent Literature 2: Japanese Patent Application Laid-Open No. 2003-9186

Patent Literature 3: Japanese Patent Application Laid-Open No. 2002-247606

However, the conventional techniques disclosed in the Patent Literatures 1 and 2 have the following disadvantages. Since each of the techniques is based on the comparison of the picture feature, it is necessary for both the transmitting end and the receiving end to extract the fair amount of the information of the picture feature so as to ensure high accuracy, and to transmit the picture feature to the central monitoring chamber over monitoring lines. As a result, for standard television ("SDTV") video transmission at a standard line rate of three to six megabits per second (Mbps), for example, lines at a rate of several hundreds of kilobits per second are necessary as the monitoring lines for transmitting the picture feature.

In theory, it is possible to reduce the amount of the information of each picture feature to several tens of kilobits per second by assuming one frame as one block, and subjecting each block to spread spectrum and orthogonal transform. To do so, however, a memory capacity necessary to extract the picture feature and a calculation volume of the orthogonal transform are increased, thereby complicating an apparatus. For this reason, it is difficult to actually realize the reduction of the picture feature by the spread spectrum and the orthogonal transform.

Further, a method of reducing the amount of the information of the picture feature by dividing a video signal into a plurality of small blocks, and subjecting each block to spread spectrum and orthogonal transform, thereby reducing a calculation volume, and by rounding off an orthogonal transform coefficient to an arbitrary bit length (quantizing the orthogonal transform coefficient) may be considered. However, if the orthogonal transform coefficient is rounded off to about one to two bits, picture evaluation accuracy is disadvantageously deteriorated to an impracticable degree.

The conventional technique disclosed in the Patent Literature 3 is intended to make it unnecessary to provide the picture feature transmission monitoring lines, and to perform picture quality evaluation by burying and detecting an invisible marker. The invisible marker is information for the picture quality evaluation. Since the invisible marker is buried in a video signal, it is advantageously possible to dispense with the monitoring lines for transmitting the picture feature. Besides, since the invisible marker is buried for each block, a scale of a system can advantageously fall within an appropriate range.

However, the conventional technique disclosed in the Patent Literature 3 has the following disadvantages. The invisible marker is buried in the video signal at a lowest signal level which does not affect a human vision, and picture quality degradation caused by burying the invisible marker is only slight. However, even the slight picture quality degradation poses a problem on transmission of program materials between broadcast stations for which quite a high picture quality is required. In this respect, the conventional techniques disclosed in the Patent Literatures 1 and 2 are superior to that of the Patent Literature 3 since transmitted videos are not deteriorated according to the Patent Literatures 1 and 2. However, the conventional techniques disclosed in the Patent Literatures 1 and 2 disadvantageously need to reduce a rate of a transmission band for transmitting the picture feature down to the impractical level of several tens of kilobits per second, and to suppress the system from being complicated, as stated above.

The disadvantages of the conventional techniques disclosed in the Patent Literatures 1 and 2 are mainly due to an increase in the amount of the information resulting from extracting a plurality of bits (normally eight to ten bits) from each block as the picture feature so as to ensure sufficiently high accuracy.

SUMMARY OF THE INVENTION

It is an object of the present invention to solve the conventional disadvantages, and enable reducing a line rate of each monitoring line necessary for picture feature transmission by making it possible to reduce the amount of the information (hereinafter, "number of expression bits") of a picture feature per block without complicating a system.

The picture feature extraction system according to the present invention enables maintaining practical accuracy even if the number of expression bits is reduced, by employing a residue of a quantized typical value of an orthogonal transform coefficient of a spread-spectrum video signal.

A first aspect of the present invention is featured that a picture feature extraction system comprises spread spectrum and orthogonal transform means for iterating spread spectrum and orthogonal transform to a video signal, divided into a plurality of blocks of an arbitrary size, once or an arbitrary times, quantizing means for quantizing an amplitude component of an arbitrary component in an orthogonal transform coefficient output from the spread spectrum and orthogonal transform means with a predetermined step size, and extracting means for extracting a picture feature of a finite bit length by obtaining a residue of a quantized typical value output from the quantizing means.

A second aspect of the present invention is featured that a picture quality evaluation system for evaluating a picture quality degradation caused by video transmission, by allowing a transmitting end and a receiving end to extract picture feature, respectively, and by allowing an evaluation section to compare the extracted picture feature of the transmitting end and the receiving end with each other, wherein each of the transmitting end and the receiving end comprises spread spectrum and orthogonal transform means for iterating spread spectrum and orthogonal transform to a video signal, divided into a plurality of blocks of an arbitrary size, once or an arbitrary times, quantizing means for quantizing an amplitude component of an arbitrary component in an orthogonal transform coefficient output from the spread spectrum and orthogonal transform means with a predetermined step size, and extracting means for extracting a picture feature of a finite bit length by obtaining a residue of a quantized typical value output from the quantizing means, and the evaluation section comprises means for calculating a value corresponding to a difference in the picture feature of an equal frame and an equal block, for the picture feature extracted by the transmitting end and the receiving end for each block, and evaluating means for evaluating a picture quality of a received picture based on a predetermined relationship between a degree of picture quality degradation defined from a distribution ratio of the difference value of the image feature in a frame and the picture quality index.

The spread spectrum and orthogonal transform means can perform the spread spectrum and Walsh-Hadamard transform, and a step size of the quantizing means and a quantized typical value can be variably set.

According to the conventional techniques, it is necessary to extract and transmit the picture feature having the amount of the information of about eight to ten bits per block so as to evaluate a picture quality with a sufficient high accuracy. According to the present invention, the amount of the information can be reduced to one to two bits. As a result, a band of the monitoring line can be reduced to one fourth to one tenth. Normally, a utilization amount of a data line depends on a transmission band. Therefore, by reducing the band of the monitoring line, an operating cost can be reduced. Furthermore, by making it possible to variably set a step size of the quantizing means and a quantized typical value, an optimum evaluation result can be output in light of estimated picture quality degradation and the band of the monitoring line.

DETAILED DESCRIPTION OF THE PREFERRED EMBODIMENT

Figure 1:
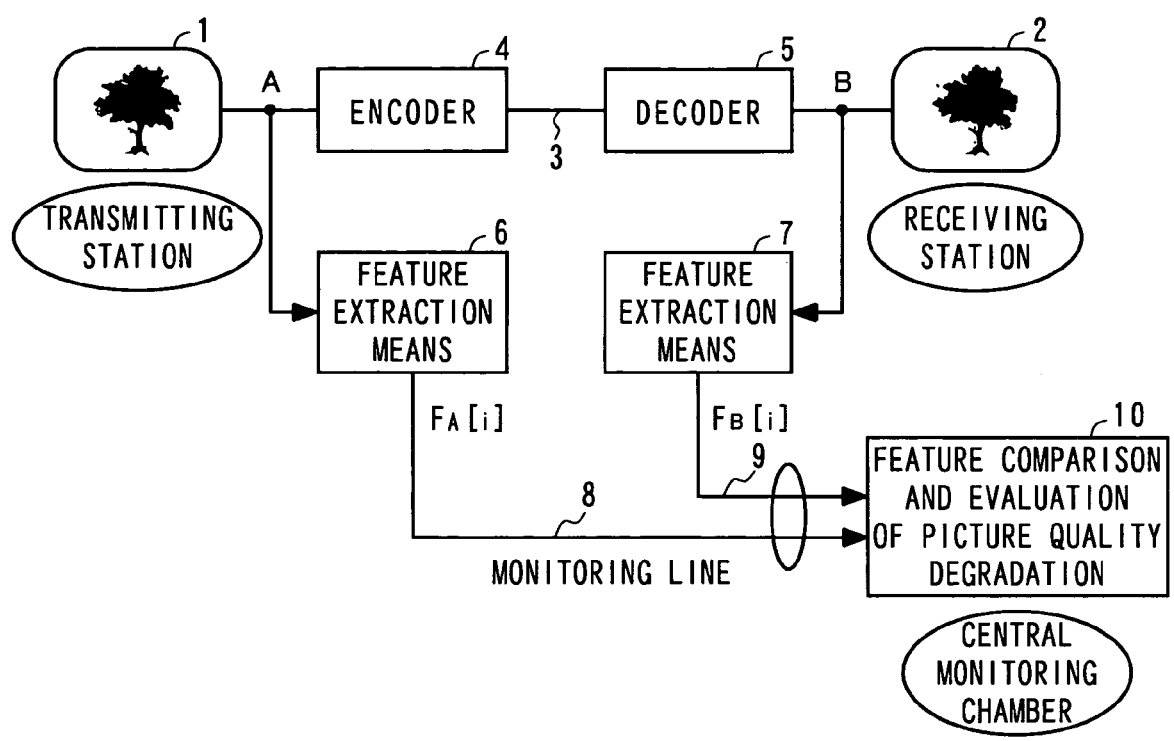
FIG. 1 is a block diagram which depicts an embodiment of a digital video transmission system to which the present invention is applied.

A picture feature extraction system and a picture quality evaluation system according to the present invention will be described hereinafter with reference to the drawings. FIG. 1 is a block diagram which depicts an embodiment of a digital video transmission system to which the present invention is applied. The embodiment shows an instance of transmitting a digital video from a transmitting station 1 to a receiving station 2 through a video transmission line 3.

When the digital video is transmitted from the transmitting station 1 to the receiving station 2, an encoder 4 on the transmitting station 1 side performs compression coding and a decoder 5 on the receiving station 2 side performs decoding. Because of the compression coding performed by the encoder 4, a transmission error on a vide transmission line 3, or the like, a picture quality at a point B on the receiving station 2 side is normally lower than a picture quality at a point A on the transmitting station 1 side.

Picture feature extracting means 6 and 7 extract picture feature $F_A[i]$ and $F_B[i]$ from video signals at the points A and B, respectively. Processings executed by the picture feature extracting means 6 and 7 are the same. In the following description, processings of the picture feature extracting means 6 and 7 are expressed by adding subscripts A and B, respectively, and processings common to the picture feature extracting means 6 and 7 are expressed without any subscripts.

The picture feature $F_A[i]$ and $F_B[i]$ extracted by the picture feature extracting means 6 and 7 are transmitted to a central monitoring chamber 10 through monitoring lines 8 and 9, respectively. The central monitoring chamber 10 serving as an evaluating section compares the picture feature $F_A[i]$ and $F_B[i]$ with each other, thereby evaluating a picture quality degradation caused by the video transmission between the transmitting station 1 and the receiving station 2.

Figure 2:
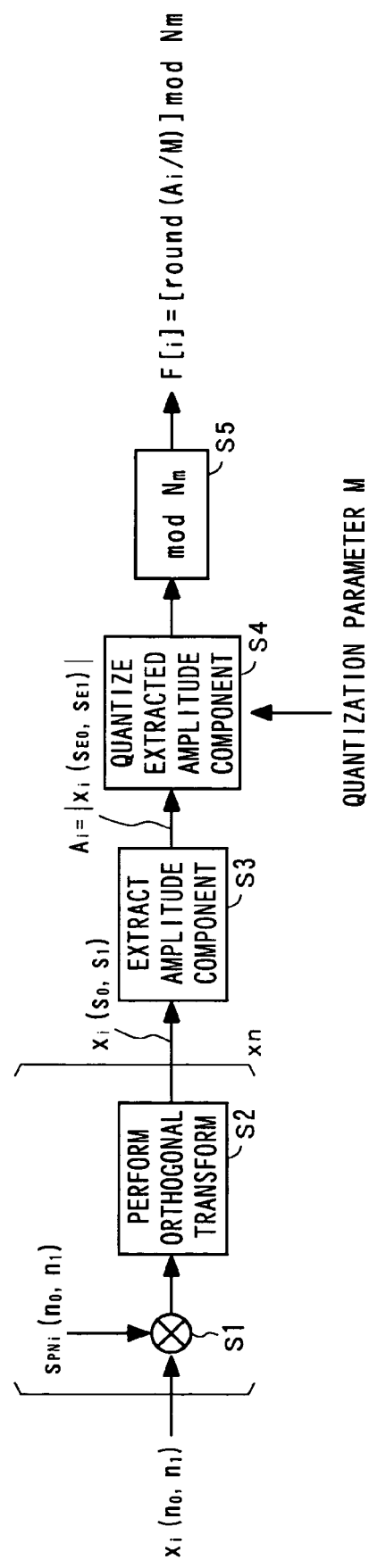
FIG. 2 is an explanatory view which depicts procedures for picture feature extraction according to the present invention.

FIG. 2 depicts one example of procedures for extracting the picture feature $F_A[i]$ by the picture feature extracting means 6 and 7. An input video signal is divided into a plurality of blocks, and a video signal of each divided block is assumed as $x_i$ ($n_0$, $n_1$). Symbols $n_0$ and $n_1$ are indexes of the video signal in a vertical direction and a horizontal direction, respectively, and symbol i is an index for identifying a position of each block on a screen.

While a size of the block can be arbitrarily selected, it is preferable to make the size coincident with a processing unit for compression coding applied in the process of video transmission. For example, for MPEG-2 coding normally employed for television transmission, a processing unit is an 8×8 pixel block. Therefore, the size of the block is preferably selected such that number of vertical and horizontal pixels is an integer multiple of eight such as 8×8 pixels, 16×8 pixels or 16×16 pixels.

The size of the block has an effect on a picture feature of each frame and a processing ability of the system. The block size is, therefore, preferably selected also in light of the picture feature or processing ability. Specifically, if the block is made large in size, the picture feature of the block can be reduced but a processing burden of orthogonal transform is increased. Conversely, if the block is made small in size, the processing burden of the orthogonal transform can be reduced but the picture feature of the frame is increased.

Referring to FIG. 2, the video signal $x_i(n_0, n_1)$ of the input block is subjected to spread spectrum by multiplying the video signal $x_i(n_0, n_1)$ by a PN sequences $S_{PNi}(n_0, n_1)$ (in a step S1). The PN sequences $S_{PNi}(n_0, n_1)$ may be an arbitrary matrix in which $(+1, +1, -1, +1, -1, -1, +1, -1, +1, \ldots)$ or the like occurs randomly.

Next, the spectrum-spread video signal is subjected to orthogonal transform such as discrete Fourier transform (DFT), discrete cosine transform (DCT), or Walsh-Hadamard transform (WHT) (in a step S2). It is assumed hereafter that the DFT is adopted as the orthogonal transform. It is noted that the WHT is the most preferable since calculation is the simplest among those of these orthogonal transform methods. Namely, with the WHT, all operations are either addition operations or subtraction operations. Due to this, even if the operations are realized by either hardware or software, they can be advantageously performed quite simply.

An amplitude component $A_i=|X_i(S_{E0}, S_{E1})|$ of an arbitrary component $(S_{E0}, S_{E1})$ in a transform coefficient $X_i(S_0, S_1)$ obtained by iterating the steps S1 to S2 once or an arbitrary times n is extracted (in a step S3). The reason for extracting the amplitude component $A_i=|X_i(S_{E0}, S_{E1})|$ is as follows. It is not a phase component but the amplitude component that influences evaluation of the MSE, which is the very object of the present invention. By iterating the steps S1 and S2, it is expected that extraction accuracy for the picture feature is improved. In addition, the amplitude component extraction (in the step S3) is a necessary processing depending on the type of the orthogonal transform. For example, the amplitude component extraction is necessary for the DFT with which an amplitude component (a real part) and a phase component (an imaginary part) are output. The amplitude component extraction is unnecessary for the DCT and the WHT with each of which only the amplitude component is output. For the DCT or the WHT, the orthogonal transform coefficient including a positive or negative sign is transmitted to the next stage as it is. Further, in order to evaluate the picture quality degradation caused by the video transmission, both the transmitting station and the receiving station need to extract the picture feature while paying attention to the amplitude component of the same arbitrary component for the same block.

The amplitude component $A_i=|X_i(S_{E0}, S_{E1})|$ is quantized with a predetermined quantization parameter (step size) M (in a step S4). The picture feature F[i] can be obtained by calculating a residue under a modulus $N_m$ of a quantized typical value obtained by the quantization in the step S4 (in a step S5).

Namely, when the step size of the quantization is M and a feature extraction target component is $(S_{E0}, S_{E1})$, the picture feature F[i] is expressed by the following Equation (1) relative to the amplitude component $A_i=|X_i(S_{E0}, S_{E1})|$.

$$F[i]=[\text{round}(A_i/M)] \bmod N_m \quad (1)$$

In the Equation (1), "round" represents that an approximate value is calculated by round-up, round-down, round-off, or the like, and "round($A_i$/M)" becomes the quantized typical value. Further, symbol $N_m$ may be an arbitrary integer. The number of expression bits $N_{exp}$ of the picture feature can be thus controlled. Preferably, however $N_m$ is $2^{Nexp}$ since the number of levels which can be expressed relative to the number of expression bits of the picture feature is $2^{Nexp}$ ({0, 1} for one bit, {0, 1, 2, 3} for two bits, {0, 1, 2, 3, 4, 5, 6, 7} for three bits, etc.).

Figure 3:
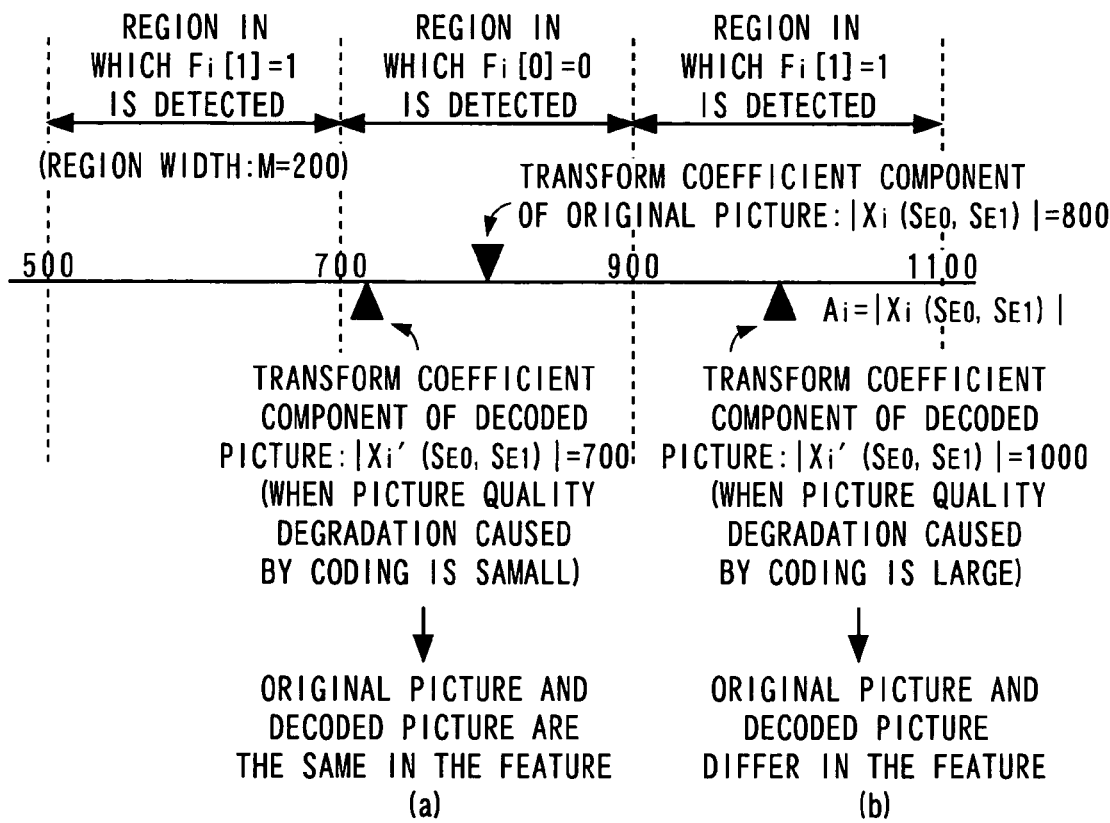
FIG. 3 is an explanatory view which specifically depicts a relationship between picture quality degradation and picture feature when the number of expression bits of the picture feature is one.

FIG. 3 depicts a specific example of the relationship between picture quality degradation and picture feature. In FIG. 3, an instance of the amplitude component $A_i=|X_i(S_{E0}, S_{E1})|=800$ of an arbitrary component $(S_{E0}, S_{E1})$ in the orthogonal transform coefficient $X_i(s_0, s_1)$ of an original picture, the step size M=200, and the number of expression bits of the picture feature $N_{exp}=1$ (therefore, $N_m=2$) is shown. An picture feature for one bit appears in a cycle of M=200 based on the Equation (1), as F[i]=0 or F[i]=1.

In FIG. 3, since the amplitude component $A_i=|X_i(S_{E0}, S_{E1})|$ of the original picture is 800, the picture feature of the original picture is recognized as $F_A[i]=0$. On the other hand, the orthogonal transform coefficient of the decoded picture normally differs from that of the original picture since picture quality degradation occurs to the decoded picture due to the video transmission such as the picture quality degradation caused by coding. When a coefficient of an arbitrary component $(S_{E0}, S_{E1})$ in the orthogonal transform coefficient of the decoded picture is $X'(S_{E0}, S_{E1})$, if the picture quality degradation caused by the video transmission is small as indicated by part (a) of FIG. 3, a fluctuation in the amplitude component $|X_i'(S_{E0}, S_{E1})|$ of the coefficient $X_i'(S_{E0}, S_{E1})$ is small (a fluctuation from 800 to 710 in FIG. 3), and the amplitude component $|X_i'(S_{E0}, S_{E1})|$ falls within the same region (700 to 900) as that of the original picture. Therefore, the picture feature of the decoded picture is $F_B[i]=0$.

If the picture quality degradation is large as indicated by part (b) of FIG. 3, a fluctuation in the amplitude component $|X_i'(S_{E0}, S_{E1})|$ of the coefficient $X_i'(S_{E0}, S_{E1})$ is large (a fluctuation from 800 to 1000 in FIG. 3). Therefore, the picture feature of the decoded picture is $F_B[i]=1$. This picture feature differs from that of the original picture.

A picture quality degradation index is obtained by checking whether the picture feature $F_A[i]$ coincides with the picture feature $F_B[i]$. Namely, the picture quality degradation index D[i] is expressed by the following Equation (2).

$$D[i]=|F_A[i]-F_B[i]| \quad (2)$$

If the parameter (step size) M for designating a cycle (region width) of the picture feature F[i] is set smaller, a picture quality degradation detection sensitivity is higher but the region width is smaller. Conversely, if the parameter M is set large, the detection sensitivity is lower but the region width is larger. Therefore, the parameter M needs to be appropriately selected in light of an expected degree of the picture quality degradation caused by the video transmission.

In FIG. 3, the instance of the number of expression bits of the picture feature $N_{exp}=1$ is shown, and the picture feature $F_A[i]$ and $F_B[i]$ are only 0 or 1, that is, either one of the two levels. Therefore, the picture quality degradation index can be acquired only by checking whether the number of expression bits of the picture feature $F_A[i]$ coincides with that of the picture feature $F_B[i]$. However, with the number of expression bits of the picture feature $N_{exp}>1$, the picture feature may possibly have three or more levels. It is therefore insufficient to conduct the coincidence check. In the latter case, the picture quality degradation may be acquired by paying attention to the difference in picture feature between $F_A[i]$ and $F_B[i]$ besides the coincidence check.

Figure 4:
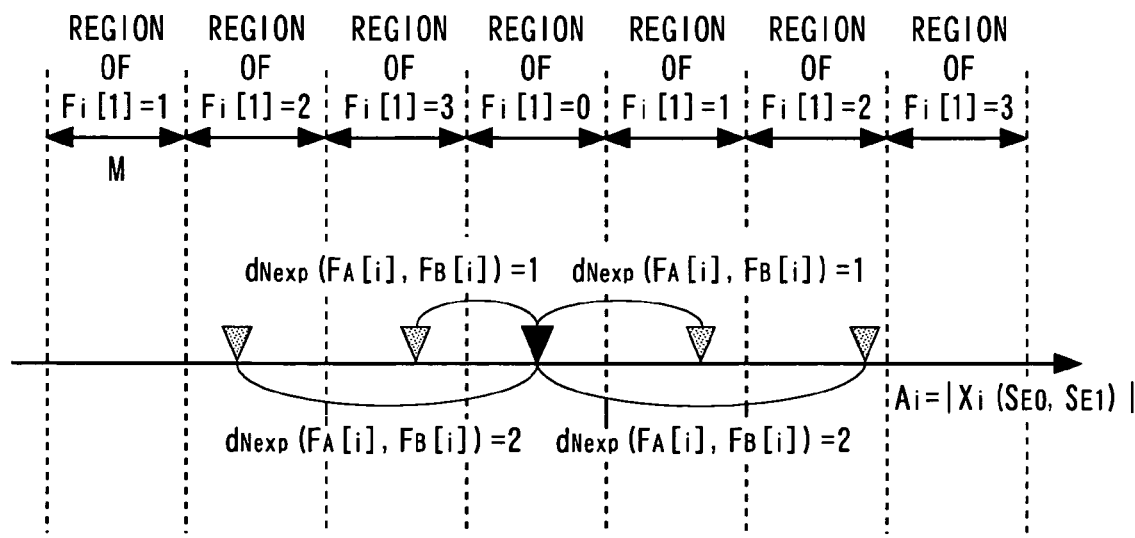
FIG. 4 is an explanatory view which specifically depicts the relationship between picture quality degradation and the picture feature when the number of expression bits of the picture feature is two.

FIG. 4 depicts the relationship between the picture quality degradation and the picture feature when the number of expression bits $N_{exp}$ of the picture feature is 2 (therefore, $N_m$=3). In FIG. 4, the picture feature may possibly have four levels according to the amplitude component $A_i$=|$X_i$($S_{E0}$, $S_{E1}$)|. This signifies that regions of picture feature F[i]=0, 1, 2, and 3 appear cyclically on a number line of $A_i$.

Since the value $A_i$ changes according to the degree of the picture quality degradation which occurs between the transmitting and receiving stations, it is considered that a region to which the $A_i$ belongs changes. To deal with the change, a distance between the regions of the picture feature of the transmitting station and the receiving station is defined as the picture quality degradation index D[i]. The picture feature is defined as the residue obtained when the amplitude component of the picture feature on each of the transmitting and receiving stations is quantized. Therefore, the distance between the regions of the picture feature of the transmitting and receiving stations cannot be obtained from the difference in picture feature between the transmitting and receiving stations (|$F_A[i]$−$F_B[i]$|). For example, the distance between the region of F[i]=0 and the region at the right of the region of F[i]=0 and the distance between the region of F[i]=0 and the region at the left of the region of F[i]=0 (the region of F[i]=$N_m$−1=3 and the region of F[i]=1, respectively) are equal. However, their differences in picture feature are 3 and 1, respectively, so that the differences do not correspond to the respective degrees of the picture quality degradation.

Considering this, a matrix which represents the correspondence between a pair of the picture feature $F_A[i]$ and $F_B[i]$ and the distance between $F_A[i]$ and $F_B[i]$ is created. The picture quality degradation index D[i] is calculated using the matrix according to the following Equation (3).

$$D[i]=d_{Nexp}(F_A[i],F_B[i]) \quad (3)$$

Figures 5, 6:
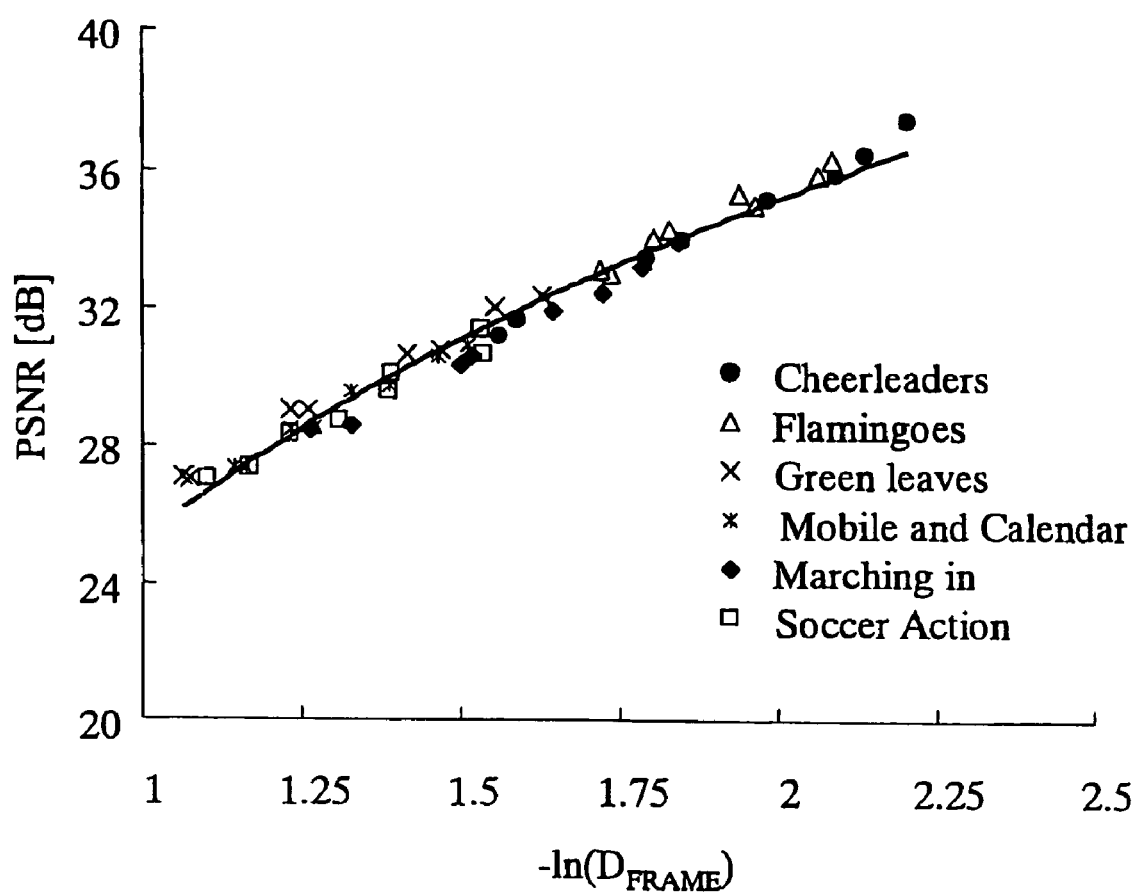
FIG. 5 depicts a matrix which represents a correspondence between a pair of picture feature and a distance between the paired picture feature.
FIG. 6 is a characteristic chart which depicts a relationship between a picture quality degradation index $D_{FRAME}$ and a PSNR.

In the Equation (3), $d_{Nexp}(X, Y)$ is a function defined by the matrix which represents the correspondence between a pair of the picture feature $F_A[i]$ and $F_B[i]$ and the distance between $F_A[i]$ and $F_B[i]$ as shown in FIG. 5.

The matrix $d_{Nexp}(X, Y)$ is created so as to represent the correspondence between a pair of the picture feature $F_A[i]$ and $F_B[i]$ and the distance between $F_A[i]$ and $F_B[i]$ as shown in FIG. 5 when the number of expression bits of the picture feature $N_{exp}$ is two ($N_{exp}$=2), for example. In the matrix of FIG. 5, it is assumed that the region of F[i]=0 and the region of F[i]=3 are adjacent each other, and the distance between the two regions is "1". In this case, the distance may actually be "3" (the region of F[i]=0 and the region of F[i]=3 at the right of the region F[i]=0 shown in FIG. 4).

However, the influence of an error that this may cause can be lessened by calculating the picture quality index for each frame as will be described later. In addition, the influence of the error can be prevented to some extent by appropriately setting the step size M for the quantization, i.e., the region width. Further, though the amount of the information of the picture feature increases, it can be dealt with by increasing the number of expression bits.

A magnitude and numeric values of the matrix differ according to the number of expression bits of the picture feature. Due to this, it is necessary to individually create matrixes for the respective number of expression bits of the picture feature. However, according to this embodiment, it suffices to describe numeric values in light of the distances on the number line of $A_i$. Since a numeric value describing method is simple, it will not be described herein.

After obtaining the picture quality degradation index D [i] for each block according to the Equation (2) or (3), the indexes D[i] are collected for each frame. As a result, the picture quality of the received picture of the frame can be evaluated based on the PSNR. A picture quality degradation index $D_{FRAME}$ of each frame is calculated by the following Equation (4).

$$D_{Frame} = \sum_{k=1}^{N_m-1} \alpha_k S_k \quad (4)$$

In the Equation (4), symbol $S_k$ is a total number of blocks which has the index D[i]=k in the frame. Symbol $\alpha_k$ is an arbitrary weight factor for $S_k$ and, for example, the weight factor $\alpha_k$ is higher as k is greater.

There is a certain correlation between the picture quality degradation index $D_{FRAME}$ and the PSNR of the received picture. Therefore, if the picture quality degradation index $D_{FRAME}$ can be calculated based on the picture feature, the picture quality degradation caused by the video transmission can be estimated. A correlation function of the correlation between the picture quality degradation index $D_{FRAME}$ and the PSNR of the received picture can be obtained by actually calculating $D_{FRAME}$ and PSNR using a plurality of test pictures in advance.

FIG. 6 depicts a regression curve of $D_{FRAME}$-PSNR characteristics obtained when tests are actually conducted for six test pictures and four bit rates. As is obvious from FIG. 6, this regression curve is unitarily set irrespective of conditions such as a pattern and a bit rate. Therefore, if this correlation is obtained using a plurality of pictures in advance, the PSNR of the received picture can be estimated only by calculating the picture quality degradation index $D_{FRAME}$ based on the picture feature.

According to this embodiment, the picture feature calculated by the transmitting station 1 and the receiving station 2 are respectively transmitted to the central monitoring chamber 10, which is provided separately from the transmitting station 1 and the receiving station 2. Alternatively, the central monitoring chamber 10 can be provided in one of the transmitting station 1 and the receiving station 2. In the alternative, it suffices to transmit only the picture feature calculated by one of the transmitting station 1 and the receiving station 2 to the central monitoring chamber 10 through the monitoring line.

The present invention can be applied as a part of an integrated monitoring control system for a video network at a maintenance and monitoring site in a video transmission service, and can realize unattended automatic monitoring. Therefore, the present invention can be contributed to an improvement in the efficiency of trouble shooting when a new service is introduced. Further, according to the present invention, a video fault due to system malfunction, wiring noise, or the like in a broadcasting station can be automatically detected. Therefore, the present invention can be applied to a video fault monitoring system provided within a studio.

What is claimed is:

1. A picture feature extraction system comprising:
   spread spectrum and orthogonal transform means for iterating spread spectrum and orthogonal transform to a video signal, divided into a plurality of blocks of an arbitrary size, once or an arbitrary times;

quantizing means for quantizing an amplitude component of an arbitrary component in an orthogonal transform coefficient output from the spread spectrum and orthogonal transform means with a predetermined step size; and extracting means for extracting a picture feature of a finite bit length by obtaining a residue under a modulus of a quantized typical value output from the quantizing means.

2. The picture feature extracting system according to claim 1, wherein the spread spectrum and orthogonal transform means performs the spread spectrum and Walsh-Hadamard transform.

3. A picture quality evaluation system for evaluating a picture quality degradation caused by video transmission, by allowing a transmitting end and a receiving end to extract picture feature, respectively, and by allowing an evaluation section to compare the extracted picture feature of the transmitting end and the receiving end with each other, wherein each of the transmitting end and the receiving end comprises:

spread spectrum and orthogonal transform means for iterating spread spectrum and orthogonal transform to a video signal, divided into a plurality of blocks of an arbitrary size, once or an arbitrary times;

quantizing means for quantizing an amplitude component of an arbitrary component in an orthogonal transform coefficient output from the spread spectrum and orthogonal transform means with a predetermined step size; and extracting means for extracting a picture feature of a finite bit length by obtaining a residue of a quantized typical value output from the quantizing means, and the evaluation section comprises:

means for calculating a value corresponding to a difference in the picture feature of an equal frame and an equal block, for the picture feature extracted by the transmitting end and the receiving end for each block; and evaluating means for evaluating a picture quality of a received picture based on a predetermined relationship between a degree of picture quality degradation defined from a distribution ratio of the difference value of the image feature in a frame and the picture quality index.

4. The picture quality evaluating system according to claim 3, wherein the spread spectrum and orthogonal transform means perform the spread spectrum and Walsh-Hadamard transform.

5. The picture quality evaluating system according to claim 3, wherein a step size of the quantizing means and a quantized typical value can be variably set.

* * * * *